(12) United States Patent
Ezer et al.

(10) Patent No.: US 10,290,405 B2
(45) Date of Patent: May 14, 2019

(54) MAGNETIC SHAPE MEMORY ALLOYS AND SPECIMENS THEREOF

(75) Inventors: Yossef Ezer, Helsinki (FI); Oleksii Sozinov, Helsinki (FI); Ladislav Straka, Helsinki (FI); Aleksandr Soroka, Helsinki (FI); Nataliya Lanska, Helsinki (FI)

(73) Assignee: ETO Magnetic GmbH, Stockach (DE)

( * ) Notice: Subject to any disclaimer, the term of this patent is extended or adjusted under 35 U.S.C. 154(b) by 750 days.

(21) Appl. No.: 14/118,565

(22) PCT Filed: May 21, 2012

(86) PCT No.: PCT/FI2012/050479
§ 371 (c)(1),
(2), (4) Date: May 12, 2014

(87) PCT Pub. No.: WO2012/160253
PCT Pub. Date: Nov. 29, 2012

(65) Prior Publication Data
US 2014/0299232 A1    Oct. 9, 2014

Related U.S. Application Data

(60) Provisional application No. 61/488,162, filed on May 20, 2011.

(30) Foreign Application Priority Data

May 20, 2011   (FI) ...................................... 20115490

(51) Int. Cl.
*C22C 1/00*      (2006.01)
*C22F 1/00*      (2006.01)
(Continued)

(52) U.S. Cl.
CPC ............... *H01F 1/03* (2013.01); *B32B 15/01* (2013.01); *C22C 1/00* (2013.01); *C22C 19/03* (2013.01);
(Continued)

(58) Field of Classification Search
None
See application file for complete search history.

(56) References Cited

U.S. PATENT DOCUMENTS 7,647,367 B2 *   1/2010   Fischer .................. G06F 7/722
                                                            380/28
7,710,766 B2 *   5/2010   Mullner .................. G11C 11/14
                                                            365/145
(Continued)

OTHER PUBLICATIONS

Ge, Y. et al. Magnetic domain evolution with applied field in a Ni—Mn—Ga magnetic shape memory alloy. Schripta Materialia, 2006, vol. 54, s.2155-2160.
(Continued)

*Primary Examiner* — Colleen P Dunn
(74) *Attorney, Agent, or Firm* — Seppo Laine Oy (57) ABSTRACT

The present technology relates to a Ni—Mn—Ga magnetic shape memory (MSM) alloy including twin boundaries type 2, which are deviated approximately +/−2-4 degrees from (101) or equivalent crystallographic plane by rotation about [−101] or equivalent crystallographic direction. This technology relates also to an actuator, sensor and harvester including MSM element of this technology.

7 Claims, 5 Drawing Sheets

(51) Int. Cl.
*C22F 1/10* (2006.01)
*H01F 1/03* (2006.01)
*B32B 15/01* (2006.01)
*C22C 19/03* (2006.01)
*C22C 30/00* (2006.01)
*H01F 41/02* (2006.01)

(52) U.S. Cl.
CPC .............. *C22C 30/00* (2013.01); *C22F 1/006* (2013.01); *C22F 1/10* (2013.01); *H01F 1/0308* (2013.01); *H01F 41/02* (2013.01); *C21D 2201/01* (2013.01); *C21D 2201/05* (2013.01); *C21D 2211/001* (2013.01); *C21D 2211/008* (2013.01)

(56) References Cited

U.S. PATENT DOCUMENTS

| | | | | |
|---|---|---|---|---|
| 7,964,290 | B2* | 6/2011 | Mullner | C22C 19/00 428/613 |
| 8,016,952 | B2* | 9/2011 | Ishida | C22C 19/03 148/312 |
| 8,233,314 | B2* | 7/2012 | Mullner | G11C 11/14 365/145 |
| 8,586,194 | B2* | 11/2013 | Mullner | B22F 3/1115 428/613 |
| 8,670,267 | B2* | 3/2014 | Watson | G11C 11/5607 365/158 |
| 9,091,251 | B1* | 7/2015 | Ullakko | G01N 21/75 |
| 2008/0225575 | A1* | 9/2008 | Mullner | G11C 11/14 365/157 |
| 2009/0092817 | A1* | 4/2009 | Mullner | C22C 19/00 428/304.4 |
| 2011/0064965 | A1* | 3/2011 | Mullner | B22F 3/1115 428/613 |
| 2011/0110139 | A1* | 5/2011 | Mullner | G11C 11/14 365/129 |
| 2012/0236632 | A1* | 9/2012 | Watson | G11C 11/5607 365/158 |
| 2014/0041761 | A1* | 2/2014 | Ezer | C21D 7/06 148/100 |

OTHER PUBLICATIONS

Ge, Y. et al. Various magnetic domain structures in a Ni—Mn—Ga martensite exhibiting magnetic shape memory effect. Journal of Applied Physics, 2004, vol. 96 s.2159-2163.

Likhachev, A.A. et al. Quantitative model of large magnetostrain effect in ferromagnetic shape memory alloys. the European Physical Journal B, 2000, vol. 14, No. 2, s.263-276.

Suorsa, I. et al. applications of magnetic shape memory actuators. [haettu Mar. 30, 2012] Internetosoitteesta: http://adaptamat.datamappi.com/wp-content/uploads/2011/02/ACTUATOR-2002-MSM-applications.pdf. Jun. 10-12, 2002.

Straka, L. et al. Twin microstructure dependent mechanical response in Ni—Mn—Ga single crystals. Applied Physics Letters, 2010, vol. 96, pp. 131903-1-131903-3.

* cited by examiner

MAGNETIC SHAPE MEMORY ALLOYS AND SPECIMENS THEREOF

BACKGROUND OF THE INVENTION

Field of the Invention

The present technology relates to a magnetic shape memory (MSM) alloys and to objects, such as elements, specimens or samples, for example actuators, wherein the objects are made of the alloy according to the present technology. The present invention also concerns methods of stabilizing mechanical and magneto-mechanical properties of objects (i.e. elements, specimens or samples) which comprise MSM alloys, as well as methods of producing magnetic shape memory alloy elements with stable mechanical and magneto-mechanical properties and especially with low twinning stress.

Description of Related Art

Ni—Mn—Ga magnetic shape memory (MSM) alloys are good candidates for actuating applications since they can exhibit magnetic field-induced strain of up to 10 percent with a rise time of less than 1 ms (MSM effect). The straining occurs due to rearrangement of martensite twin variants by motion of twin boundaries. Applications based on reverse mechanism have also been suggested including sensing, energy harvesting, and damping.

The actuating mechanism of MSM alloys has also a limitation related to mechanical hysteresis of twin boundary motion. The hysteresis can be described by twinning stress (TS), $\sigma_{TW}$, which has been reported to be in the range of 0.1-2 MPa. According to the model of MSM effect introduced by Likhachev and Ullakko [1] it follows that to obtain a reversible MSM effect, the twinning stress must be less than half of the magnetic stress, i.e. less than about 1.5 MPa because the maximum magnetic stress ($\sigma_{MAG}$) is about 3 MPa for 5-layered Ni—Mn—Ga martensite at room temperature.

In a typical magnetic actuator, the energy $\approx 2 \cdot \varepsilon \sigma_{TW}$ (where $\varepsilon$ is the actuating strain) is dissipated during each actuating cycle. When the twinning stress is large, the overall performance of MSM material is low: considerable energy is dissipated leading to undesirable heating of the material, the applied magnetic field must be rather large to overcome high TS, output force and strain may be considerably smaller than the maximum theoretical values. These drawbacks make the exploitation of MSM alloys with high TS in actuators difficult or expensive.

Conversely, the closer the twinning stress is to zero, the higher is the efficiency of the MSM effect and the better actuating performance of the MSM material.

SUMMARY OF THE INVENTION

It is an aim of the present invention to provide novel kind of MSM materials which exhibit low twinning stress for twin boundary (in the following also abbreviated "TB") motion under the influence of mechanical and/or magnetic forces.

Additionally the present invention introduces novel methods to create dense laminate twin microstructures (or other twin variant microstructure) comprising mainly of twin boundaries type 2, in 5-layered (10M) Ni—Mn—Ga alloy samples.

The crystal structure of 5-layered Ni—Mn—Ga martensite has a modulated monoclinic lattice [2]. The basic monoclinic lattice of that martensite is slightly distorted from a tetragonal lattice.

The maximal mechanical stress induced and/or magnetic field induced strain can be achieved in 5-layered Ni—Mn—Ga martensite by almost 90 degrees reorientation of the short crystallographic c-axis (referred to here and in the following as so-called cubic parent phase coordinates) by type 1 or type 2 twin boundary motion [3]. Existence of TB type 1 and type 2, comparing with compound twinning (101) [–101] or equivalent crystallographic twinning system in a tetragonal lattice, is a direct consequence of a monoclinic distortion of the tetragonal lattice.

The twin boundaries with exact twin plane orientation of (101) or (011) (or equivalent crystallographic planes) are twin boundaries type 1.

The twin boundaries deviated approximately 2-4 degrees from plane (101) or (011) by rotation about axis [–101] (or [0–11]) (or equivalent crystallographic planes and directions) are twin boundaries type 2. The deviation depends on lattice distortion and is 2-4 degrees for typical Ni—Mn—Ga 5-layered martensite. It can be calculated also for other MSM alloys by using data for lattice parameters.

It is worth to note that type 1 and type 2 twin boundaries have different symmetry relationship between parent and twin domains. It is well known that TB type 1 has mirror relationship and rational twinning plane between the adjacent domains. While for TB type 2 the domains are related by 180° rotation about rational twin shear direction. In the case of the TB type 2, the twinning plane is deviated from exact rational position and as a result, an angle exists between traces of TB type 1 and type 2 on the flat sample surface.

In the present technology it was surprisingly found that TB type 2 has approximately ten times lower twinning stress than TB type 1 under external stress or/and magnetic field in 5-layered Ni—Mn—Ga martensite specimens, even for the same specimen.

Accordingly, in one aspect the present technology provides 5-layered Ni—Mn—Ga magnetic shape memory alloy specimens which exhibit twin boundaries type 2. In particular, a 5-layered Ni—Mn—Ga magnetic shape memory alloy martensite specimen is provided in which twin boundary motion is facilitated primarily by twin boundaries type 2. The boundaries connect adjacent crystallographic domains by rotation about twin shear direction [–101] or equivalent. As a result of the rotation, the twinning plane of such a boundary is deviated about ±2-4 degrees from the (101) or equivalent crystallographic plane by rotation about [–101] or equivalent crystallographic direction.

In a further aspect, the present technology concerns an MSM device, selected from the group of actuators, sensor and energy harvesters, including an element for producing motion and force or a combination thereof under the influence of external mechanical or magnetic forces, wherein the element includes or consists of an MSM material according to the present technology.

Finally, the present technology provides for methods of producing alloy specimens exhibiting properties of very high mobility of TB (low twinning stress) and of stabilizing such specimens. One method includes a step in which in (MSM) martensite alloy specimens twin boundaries deviating about ±2-4 degrees from the (101) or equivalent crystallographic plane by rotation about [–101] or equivalent crystallographic direction) are created for example by subjecting the specimens to mechanical stress, to magnetic field or another suitable treatment or combinations of two or more treatments. The MSM materials can further be subject to a treatment in which the surface or surface layer (0 . . . 20%, for example 0 . . . 10%, of sample thickness, smallest dimension of the sample) of the element (i.e. the alloy specimen) is modified, preferably by mechanical, magnetic, thermal or chemical processing or a combination thereof, in order to stabilize the microstructure and modify the magneto-mechanical properties of the element.

In another method, the steps include determination of the direction of twin boundary type 2 in martensite state;

transformation of the sample to austenitic state (cubic lattice);

making deformation line(s) or stripe(s) along the direction that was determined in the first step; and after a transformation back to martensitic state, at least a pair of TBs type 2 are nucleated and maintained at the deformation line/stripe created.

More specifically, the present alloy specimens are characterized by having 5M-crystal structure in which twin boundary motion is facilitated primarily by twin boundaries type 2 with twinning plane deviating about ±2-4 degrees from the (101) or equivalent crystallographic plane by rotation about [−101] or equivalent crystallographic direction.

The set of alloy specimens is characterized by comprising a plurality of Ni-Mn-Ga magnetic shape memory (MSM) alloy specimens, at least 95 % of the alloy specimens consisting of an alloy in accordance with at least a method of producing a set of 5-layered magnetic shape memory (MSM) alloy specimens, for example of 5-layered Ni-Mn-Ga alloy specimens, comprising the steps of a) providing a plurality of 5-layered magnetic shape memory (MSM) martensite alloy specimens;

b) creating in the specimens twin boundaries type 2, said twin boundaries deviating about ±2-4 degrees from the (101) or equivalent crystallographic plane by rotation about [−101] or equivalent crystallographic direction);

c) recovering the specimens obtained in step b; and d) optionally stabilizing the structure of the specimens obtained in step b or c, wherein the method may be in accordance with any of the following bulleted list:

wherein the twin boundaries type 2 are created in step b by subjecting the specimens to mechanical stress, by magnetic field or another suitable treatment or combinations of two or more treatments, wherein the surface of the specimens is modified in order to stabilize the microstructure and to modify the magneto-mechanical properties of the clement, wherein the surface modification is carried out by mechanical, magnetic, thermal or chemical processing or a combination thereof, wherein the surface modification is carried out by a method selected from the group of inscribing, radiating, impacting, grinding, local heat treatment, global heat treatment, binding additional material(s), injecting additional material(s) and combinations thereof, wherein a specimen with twin boundary /boundaries type 2 is created in step b) by - transforming the alloy specimen to single variant state by application of mechanical stress; and compressing the sample along the long crystallographic a-axis having 5M-crystal structure in which twin boundary motion is facilitated primarily by twin boundaries type 2 with twinning plane deviating about ±2-4 degrees from the (101) or equivalent crystallographic plane by rotation about [−101] or equivalent crystallographic direction, wherein the twin boundary/boundaries type of the alloy specimen of step b) is identified, for example, by measuring of the stress-strain curve and elements exhibiting twin boundary/boundaries type 2 are selected according to the twinning stress, wherein elements with undesired twin structure are recirculated to Step 1, and the actuators or other MSM device according to the present technology by an element for producing motion and/or force, said element comprising a magnetic shape memory alloy specimen according to an MSM alloy specimen which has 5M-crystal structure in which twin boundary motion is facilitated primarily by twin boundaries type 2 with twinning plane deviating about ±2-4 degrees from the (101) or equivalent crystallographic plane by rotation about [−101] or equivalent crystallographic direction optionally in accordance with any combination of the aspects listed in the following bulleted list:.

wherein twin boundaries type 2 connects adjacent crystallographic domains by rotation about twin shear direction [−101] or equivalent crystallographic plane, and in result of the rotation the twinning plane of such a boundary is deviated approximately by ±2-4 degrees from the (101) or equivalent crystallographic plane by rotation about [−101] or equivalent crystallographic direction.

wherein the specimen comprises segmented twin boundaries of type 2, wherein the twinning stress for the MSM alloy is less than 0.3 MPa.

wherein the alloy is a composition of at least two, preferably three or more elements selected from the group of Ni, Mn, Ga, Cr, Co, Cu, Fe, Ti, Al, In, Zr, Mo, Ta, W, V, Nb ,Y and Pd, wherein the alloy is a composition of Ni. Mn and Ga, with an optional addition of at least one element selected from the group of Cr, Co, Cu, Fe, Ti, Al, In, Zr, Mo, Ta, W, V, Nb, Y and Pd.

wherein the alloy is S-layered Ni-Mn-Ga magnetic shape memory alloy. The present methods are characterized by at least one of the following methods listed in the bulleted list that follows;

a method comprising the steps of a) providing a plurality of 5-layered magnetic shape memory (MSM) martensite alloy specimens;

b) creating in the specimens twin boundaries type 2, said twin boundaries deviating about ±2-4 degrees from the (101) or equivalent crystallographic plane by rotation about [−101] or equivalent crystallographic direction);

c) recovering the specimens obtained in step b; and optionally stabilizing the structure of the specimens obtained in step b or c;

A method of modifying an element of a magnetic shape memory alloy having a surface, said method comprising the step of modifying the surface layer of the element to activate or to activate and stabilize fine twin type 2 variant structure of the element;

A method of modifying an element of a magnetic shape memory alloy having a surface, said method comprising the step of modifying the surface layer of the element to activate or to activate and stabilize fine twin type 2 variant structure of the element, wherein the mechanical and magneto-mechanical properties of the element are modified.

Considerable advantages are obtained by the present invention. Thus, provision of specimens which contain primarily twin boundaries type 2 greatly improves the application potential of MSM material due to considerable decreasing of twinning stress. MSM elements can be obtained with very low twinning stress and long fatigue life.

The present technology also stands for the previously missing step for large scale production of MSMA elements with low twinning stress and other properties selected from the group of stable, repeatable, tailored, designed, desired mechanical and magneto-mechanical properties and any combinations thereof.

BRIEF DESCRIPTION OF THE DRAWINGS

FIG. 7. Shown is an MSM-element in austenitic state with cubic lattice. The dashed line shows the orientation of the future TB type 2 determined in FIG. 5 or 6. The thick black line on the front surface of the element shows the direction of a hot directed deformation pattern (DDP) that is applied.

FIG. 8. Shown is DDP-treated MSM-element in martensitic state. A pair of parallel TBs type 2 with low twinning stress is automatically nucleated and maintained at each deformation line/stripe created in Step 2 of DDP process.

DETAILED DESCRIPTION OF PREFERRED EMBODIMENTS

As mentioned above, ferromagnetic Ni—Mn—Ga alloys show a giant magnetic field-induced strain or MSM effect. The mechanism of an MSM effect is based on the rearrangement of crystallographic domains (twin variants) in an applied magnetic field, which lowers magnetization energy. This mechanism operates at temperatures below the Curie point ($T_C$) and martensitic transformation temperature ($T_M$). The behavior of the material in the magnetic field is determined by such material parameters as magnetocrystalline anisotropy ($K_U$), saturation magnetization, and mechanical stress necessary for twin variant rearrangement (twinning stress).

In the present disclosure, the term "specimen" is used for designating individual elements or samples for the metal alloy. Typically the specimens comprise a single crystal.

We have found that two types of twin boundaries ("TBs") are present in high purity Ni—Mn—Ga 5M martensite, viz. so called "soft" and "hard" TBs with twinning stress level below 0.3 MPa and order of 1 MPa, correspondingly. The fact that such kind of twin boundaries have remarkable differences in their mobility has not been recognized earlier.

In the present technology it was established that "soft" and "hard" TBs correspond to TB type 2 and TB type 1, correspondently.

Based on this finding, elements can be provided with a stabile twin variant microstructure comprising mainly twin boundaries of type 2 which stands for a very low twining stress.

It is possible to distinguish twin boundaries type 1 from type 2 by observing their trace angle visible on the sample surface or, optionally, by an x-ray diffraction method. In this respect reference is made to FIG. 1.

Figure 1:
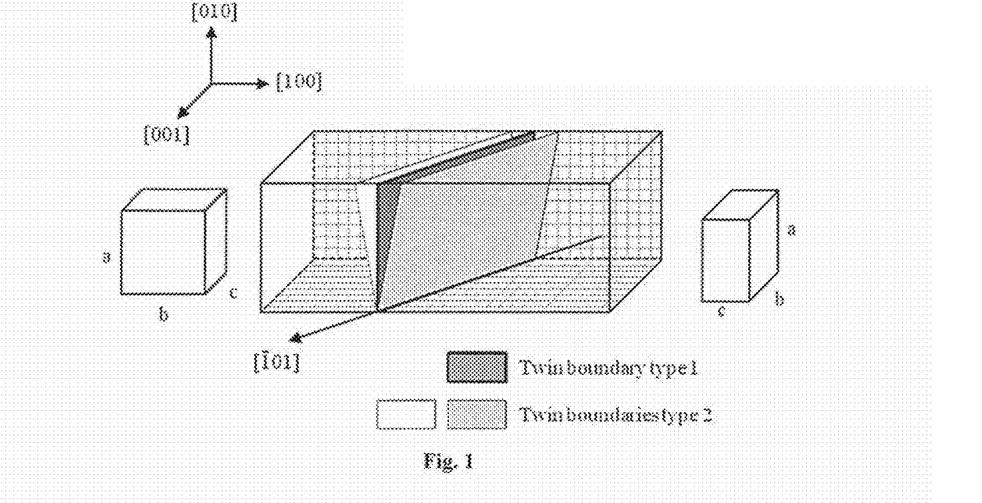
FIG. 1. Schematic drawing of Ni—Mn—Ga specimen with planar (101) TB type 1 (middle plane with thick frame) and two possible orientations for the planar TBs type 2 (planes which are tilted to left and right) deviated from (101) by rotation about direction [−101]. In the figure, all three TBs are driven in contact to each other. They meet each other on the bottom dead-plane along direction [−101]. The coordinate system used in the figure is derived from cubic parent phase (austenite). All indexes refer to the matrix crystal located on the left side of the figure.

FIG. 1 shows schematically the crystallographic orientations of twin boundary type 1 (orientation exactly (101)) and type 2 (boundary deviated approximately 2-4 degrees by rotation about direction [−101]) in a 5-layered Ni—Mn—Ga MSM alloy. It should be noted that for twin boundary type 2 there are two orientations (with positive and negative angle of deviation from plane (101)) connected with two possible orientations of modulation directions. The coordinate system used in FIG. 1 is derived from cubic parent phase (austenite). All indexes are referred to the matrix crystal located on the left side of FIG. 1.

The active plane is (001) (the specimen was cut along the {100} planes of the parent phase) on which the twin boundaries create a trace that is close to direction [100]. The 2-4 degrees deviation of TB type 2 by rotation about direction [−101] is observed on active plane (001) as 4-3-6 degrees deviation of twinning plane trace from the direction [010]. The typical value of twinning stress for TB type 2 is 0.05-0.3 MPa (see FIG. 2 below), but values as low as 0.02-0.03 MPa were observed also in a few cases.

Figure 2:
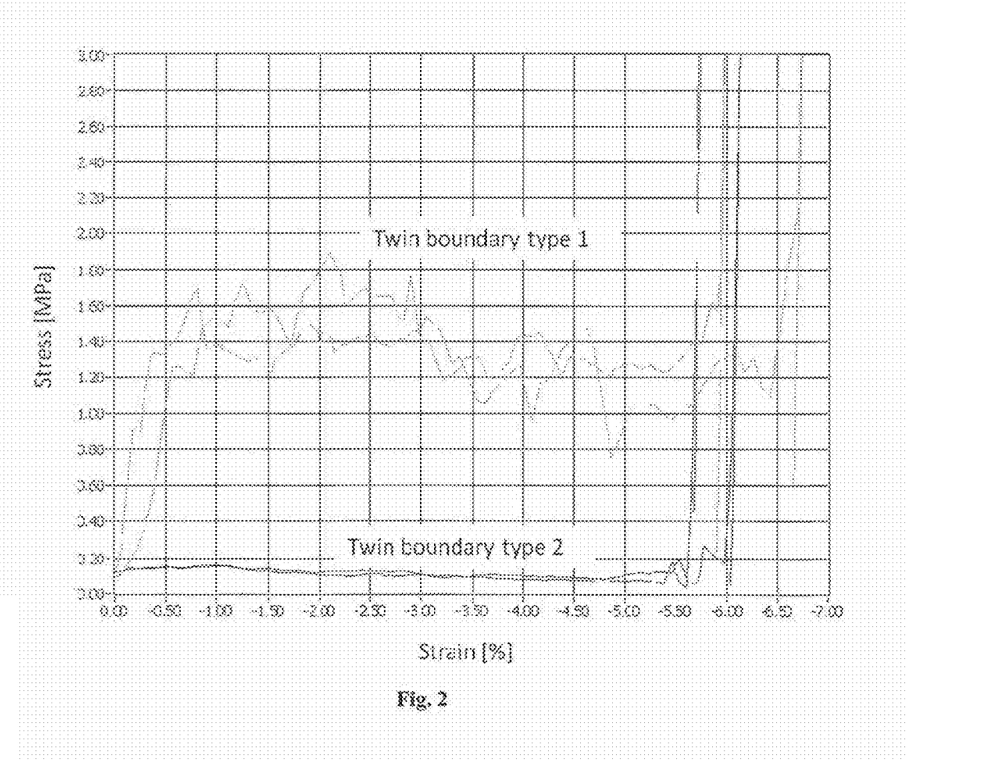
FIG. 2. Stress-strain curves measured at room temperature during compression of a 5-layered Ni—Mn—Ga MSM alloy specimen which contained TB type 1 (upper curves) or TB type 2 (lower curves).

FIG. 2 shows stress-strain curves obtained during compression of a 5-layered Ni—Mn—Ga MSM alloy specimen with TB type 1 or type 2. The curves were measured on the same specimen and at the same temperature. Typically for the TB type 1 the twinning stress is over 1 MPa and for type 2 is in the range of 0.05-0.3 MPa. The twinning stress is determined approximately by the stress level of detwinning plateaus on the stress-strain curve.

Figure 3:
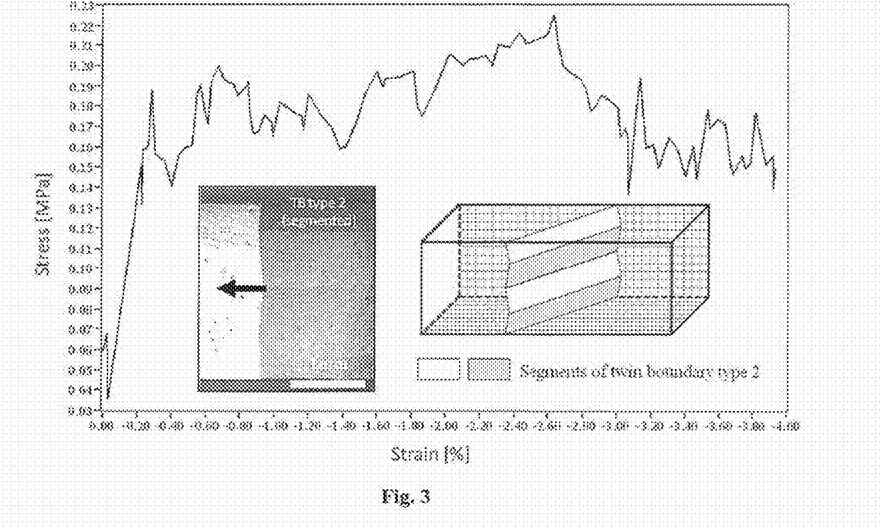
FIG. 3. Stress-strain curve measured at room temperature during compression of a 5-layered Ni—Mn—Ga MSM alloy specimen which contained segmented TB that consists of TB type 2 segments. The segments correspond to two possible orientations of the planar TBs type 2 shown in FIG. 1.

It was also found that the twin boundary can consist of TB type 2 segments as shown by inset on the right of FIG. 3. Matrix and twin crystal orientations in the inset are the same as in FIG. 1.

FIG. 3 shows stress-strain curves obtained during compression of a 5-layered Ni—Mn—Ga MSM alloy specimens with segmented twin boundary consisting of TB type 2 segments, corresponding to positive and negative deviation from plane (101) (see FIG. 1). Such twin boundary exhibits low twinning stress of about 0.2 MPa.

Inset on the left in FIG. 3 shows an optical microscope micrograph of the segmented twin boundary as it can be seen on the sample face (001).

Figure 4:
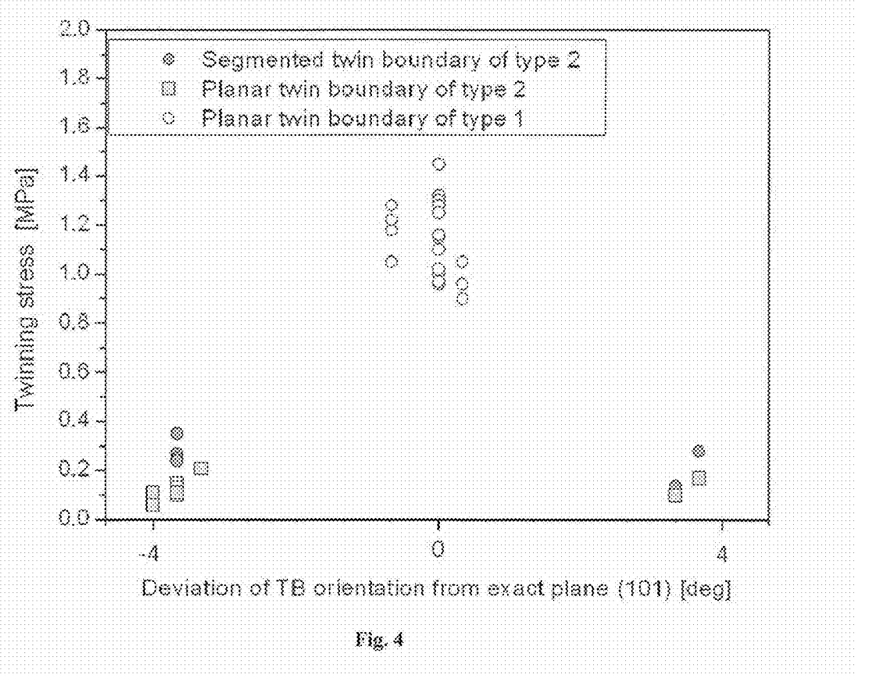
FIG. 4. Experimentally revealed correlation between the deviation of TB orientation from exact plane (101) or (011) (or equivalent crystallographic planes) and the twinning stress of the corresponding TB.
Figure 5:
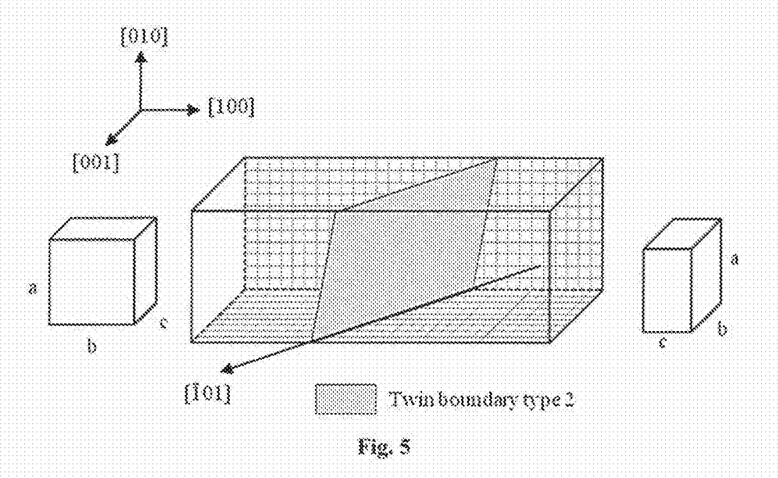
FIG. 5. Shown is an MSM-element in martensitic state, with orientation of planar single twin boundary Type 2, if the sample would be in real single variant state with single modulation direction. The trace of twin boundary Type 2 can be seen on front surface at angle which is almost vertical, but deviates from that direction a few degrees.

It is important to note that the values of twinning stress for planar and segmented TB type 2 are about the same and considerably lower when compared with twinning stress for TB type 1. That was confirmed by systematical experimental investigations with multiple 5-layered Ni—Mn—Ga MSM alloy specimens. As shown in FIG. 4, the stress level for motion of TB consisting of TB type 2 segments (squares) is only slightly higher in comparison to the twinning stress for planar TB type 2 (dark circles). Whereas, the planar TB type 1 (white circles) requires much higher stress level for movement in comparison with TB type 2.

Table 1 summarizes the calculated efficiencies for selected magnitudes of twinning stress using $\eta=(\sigma_{MAG}-2\sigma_{TW})/\sigma_{MAG}$ and $\sigma_{MAG}=3$ MPa. As the generation of the magnetic field is typically costly and bulky, one would like to avoid unnecessary losses and keep the efficiency higher than 80%.

TABLE 1

Efficiency of MSM effect $\eta = (\sigma_{MAG} - 2\sigma_{TW})/\sigma_{MAG}$ determined using magnetic stress $\sigma_{MAG} = 3$ MPa for selected levels of twinning stress $\sigma_{TW}$.

| Twinning stress $\sigma_{TW}$ MPa | Efficiency $\eta$ % | Note |
|---|---|---|
| >3 | | No MSM effect |
| 1.5-3 | | Irreversible (one way) MSM effect |
| 1.4 | 7 | |
| 1 | 33 | |
| 0.5 | 66 | |
| 0.3 | 80 | |
| 0.1 | 93 | |
| 0 | 100 | Ideal MSM material |

As shown in Table 1, the desired aim can be reached only if the twinning stress is less than 0.3 MPa.

According to one embodiment, the present technology concerns a Ni—Mn—Ga magnetic shape memory alloy in which twin boundary motion is facilitated primarily by planar (see FIG. 1) or segmented (see FIG. 3) twin boundaries type 2.

According to another embodiment the present technology concerns Ni—Mn—Ga magnetic shape memory alloys in which twin boundary motion is facilitated exclusively by planar or segmented twin boundaries type 2.

The present invention also allows for the provision of a set, comprising a plurality of Ni—Mn—Ga magnetic shape memory alloy specimens or samples, of which at least 95%, preferably 98% consist of an alloy in which twin boundary motion is facilitated primarily by twin boundaries type 2.

According to one embodiment the present technology concerns an MSM device, selected from the group of actuators, sensor and energy harvesters, including an actuating element for producing motion and force or a combination thereof, whereby the element consist of a magnetic shape memory material produced according to the present technology.

Various embodiments for creation or activation and stabilization of highly desired twin boundary type 2 and or any twin variant structures (desired tailored, designed) comprising or consisting primarily of twin boundaries type 2 are provided, which allows the production on a large scale of MSMA elements with low twinning stress and properties selected from the non-limiting group of stable, repeatable, desired mechanical and magneto-mechanical properties and combinations thereof.

In this respect, the present technology also concerns a method of stabilization of mechanical and magneto-mechanical properties via creation of the twin type 2 variant microstructure of objects (i.e. elements, specimens or samples) which comprise MSM alloys.

For some applications Ni—Mn—Ga samples with dense laminate twin microstructures are beneficial. However, designing such twin microstructures containing mainly type 2 twin boundaries is a task which is not solved in the art.

In the context of the present new technology, it has been found that, for example, the well-known method of sample bending, applied to 10M Ni—Mn—Ga martensite, produces laminated twin microstructure consisting of twin type 1. It results in high twinning stress [4]. Another known method (for calcite crystals) to create twin boundary is to use concentrated load acting on a sample surface by knife edge [5]. The contact line between the knife edge and the sample should be parallel to the twinning plane and perpendicular to twin shear direction.

The problem to use this method for 10M 5-layered Ni—Mn—Ga martensite is the complex domain microstructure in the Ni—Mn—Ga created during martensite phase transformation. An application of a magnetic field or a stress to a martensite sample simplifies microstructure considerably but does not transform it to real single variant state. Particularly, so-called modulation domains, possessing the same direction of short crystallographic c-axis, but different direction of lattice modulations, do not disappear and are observed in Ni—Mn—Ga samples making the use of the method introduced in [5] very difficult or simply impossible.

Figure 6:
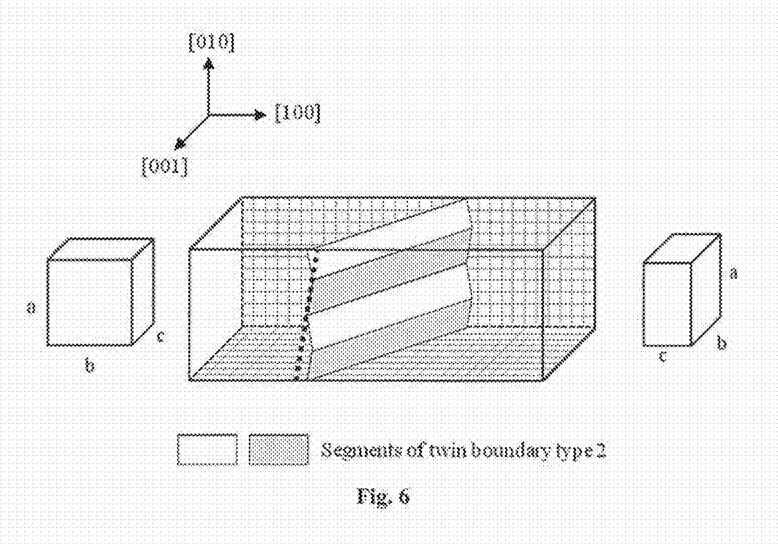
FIG. 6. Shown is an MSM-element in martensitic state, with segmented single twin boundary Type 2. The direction of the thick dashed line, which can be determined on one set of segments, corresponds to the direction of the trace if the sample were in real single variant state with single modulation direction.
Figure 7:
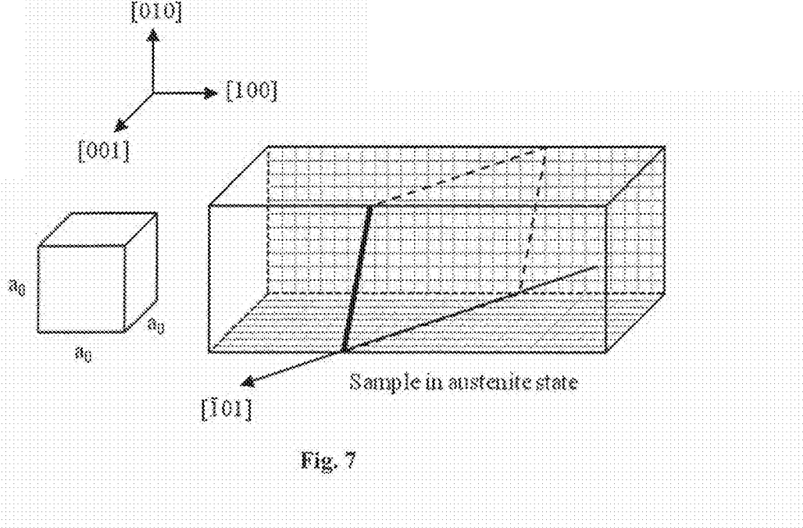
Figure 8:
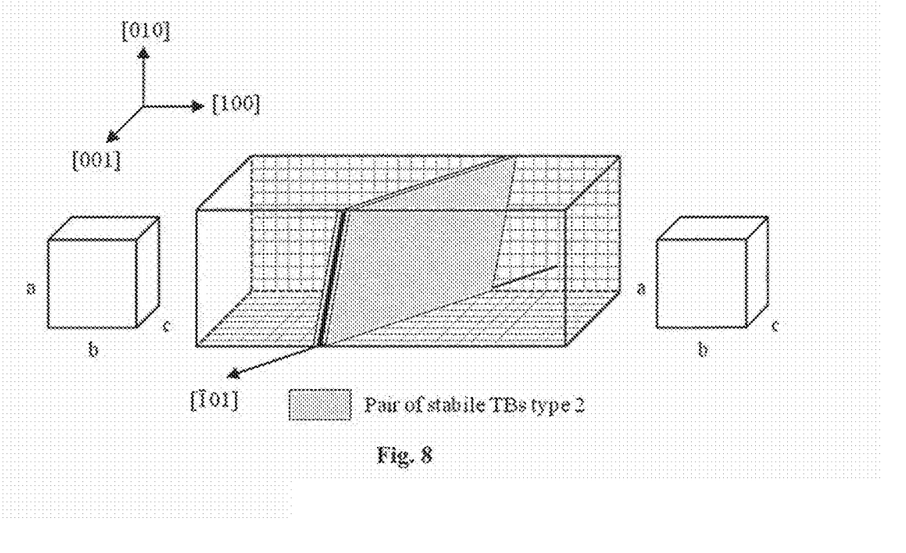

Orientation of TB type 2 is different in the domains with different modulation directions (see FIG. 6). The difference in the orientation of TB type 2 traces on the active sample surface is about 10-12 degrees for different modulation domains, as it is shown in FIGS. 1, 3, and 6. This modulation domain structure makes it difficult or impossible to use the method developed for calcite [5].

Previously in the art it was not known how to control the nucleation and stabilization of twin boundaries type 2.

According to one embodiment the MSM elements are produced by a method which comprises the steps of
a) providing a plurality of 5-layered Ni—Mn—Ga magnetic shape memory (MSM) martensite alloy specimens,
b) creating in the specimens, for example by mechanical stress, by magnetic field or another suitable treatment or combinations of two or more treatments, twin boundaries type 2, said twin boundaries deviating about ±2-4 degrees from the (101) or equivalent crystallographic plane by rotation about [−101] or equivalent crystallographic direction),
c) recovering the specimens obtained in step b, and
d) optionally stabilizing the structure of the specimens obtained in step b or c.

According to one embodiment, the creation of a specimen with twin boundary/boundaries type 2 (see b above) is carried out as follows:

Step 1: Transformation of the specimen to single variant state by application of mechanical stress; said mechanical stress being strong enough for transforming the specimen to said state.

Step 2: Creating twin boundary/boundaries by compressing the sample along the long crystallographic a-axis.

Step 3: Identification of the twin boundary/boundaries type (type 1 or type 2), for example, by measuring of the stress-strain curve (see FIG. 2) and selecting the elements with desired twin structure (twin boundary/boundaries type 2) according to the twinning stress.

Step 4: Recirculating the specimen with undesired twin structure to Step 1.

This method allows for the production of a set of 5-layered, in particular Ni—Mn—Ga, magnetic shape memory (MSM) alloy specimens, essentially all of said specimens having a twinning stress less than 0.3 MPa, typically 0.05-0.1 MPa.

A particular embodiment of a method according to the present technology, which is herein also referred to as DDP (Directed Deformation Patterning), comprises the following steps:

Step 1: Determination of the direction of twin boundary type 2 (in martensite). This can be carried out for example by a careful x-ray study or by optical microscopy.

Step 2: Transformation of the sample to austenitic state (cubic lattice) by heating. At least one deformation line or stripe is made along the direction that was determined in Step1. The line or strip can be made by, for example, using an indenter tip, inscribing, impacting, grinding, surface rolling, stamping, radiating, chemically, magnetically, local heat treatment, binding additional material(s), injecting additional material(s) and combinations thereof.

Step 3: Transformation of the sample back to martensitic state. This transformation can be performed by cooling. As a result, at least a pair of TBs type 2 are automatically nucleated and maintained at the deformation line or stripe created in Step 2.

If a more dense twin variant microstructure is desired, more lines or stripes can be applied.

Figure 9:
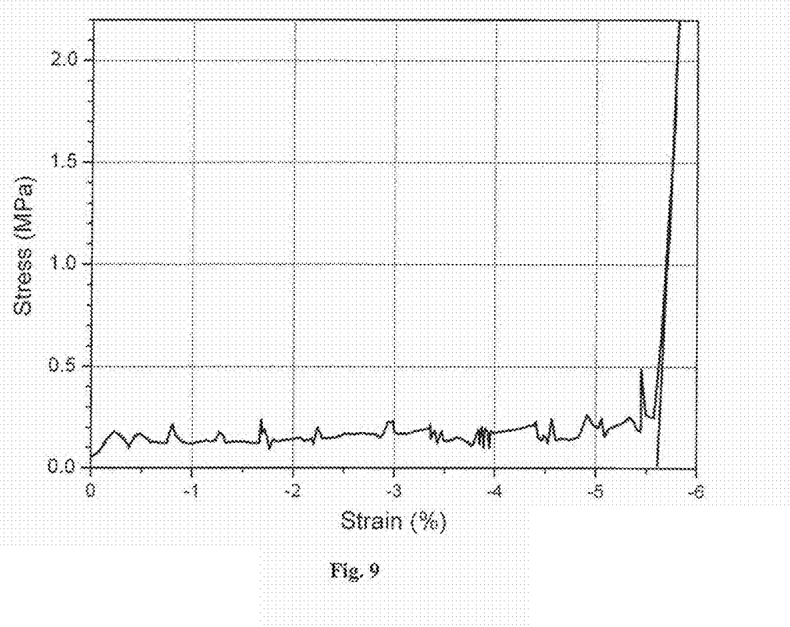
FIG. 9. Shown is a stress-strain curve measured during compression of an MSM element that was subjected to the present DDP treatment. The obtained laminated twin microstructure comprises of TBs type 2 and demonstrates a low twinning stress of about 0.3 MPa.

The beneficial mechanical properties of a MSM element after such treatment are shown in FIG. 9. As it can be seen from the figure, the twinning stress of such MSM-element is very low, approximately 0.2-0.3 MPa, and the shape of the curve is relatively proportional. The stress-strain curve is very repeatable between measurements for a single element and for different elements as well. The low twinning stress means that in magneto-mechanical or magnetic actuation the element can be actuated in very low field of approximately <0.2 T.

In connection with the preferred embodiments it was found that by the present surface modification it is possible to control the twin boundary type and thus obtain desired magneto-mechanical properties such as low twinning stress for example in the whole MSM bulk material.

The invented surface treatment results in stable macroscopic martensite twins type 2, or their microscopic nuclei, or embryos, which are approximately parallel, evenly or unevenly separated depending on the applied deformation pattern.

Permanent twins type 2 prevent nucleation of other twin types (for example twins type 1) and other twin directions in two ways. First, their boundaries are readily movable by an external stress or magnetic field, which movement occurs instead of nucleation of new twins. Second, they extend through the considerable volume of the crystal which makes nucleation of any other twin system energetically very unfavorable.

The preferred embodiment reduces or even removes the problem of appearance of unwanted twin boundary types and twin variant microstructures, the embodiment also stabilizes the structure such that a 3-dimensional object or element produced from an MSM material will have predictable properties, in particular it will have low twinning stress and predictable response to magnetic fields and mechanical actuation.

Thus, the present technology provides for a method of modifying an element of a magnetic shape memory alloy having a surface, said method comprising the step of modifying the surface layer of the element to activate or to activate and stabilize fine twin type 2 variant structure of the element.

According to one embodiment, the stabilization method comprises a step of surface modification of the element. Such treatment is, according to a particular embodiment carried out, preferably on a 3-dimensional object formed by the alloy, by mechanical, magnetic, thermal, chemical or radiation processing or a combination thereof.

Examples of mechanical processes are inscribing, impacting, grinding, surface rolling, stamping and similar mechanical processes wherein an imprint or impression is achieved on the surface. Typically, the extent of the mechanical processing is limited to a part of the surface of the object.

It is assumed that generally, it is sufficient by plastic deformation to create residual tensile or compressive stresses in direction approximately perpendicular to twin type 2 trace on sample surface which will result in shear stress on the twinning plane. The surface treatment aims at directed deformation of the surface or surface layer (the depth of penetration of the surface treatment being 0 to 20% of the minimum dimension of the specimen). Preferably the directed deformation achieved by mechanical treatment is a plastic deformation.

In case of non plastic deformation, it typically is sufficient to introduce residual stresses which create similar stress field as discussed above.

Specific embodiments of the stabilization method include the following:

performing surface modification to at least a part of the whole surface;

performing surface modification by applying geometrical pattern to the surface;

performing surface modification by applying geometrical pattern comprising of lines or lines and strips to the surface in the direction of the trace of twin type 2 on the sample surface;

performing patterning is performed onto 1 to 100%, of the surface of the alloy;

carrying out surface treatment on an MSMA element in austenite state;

carrying out surface treatment at a temperature higher than the austenite temperature by local surface rolling, indentation or stamping; said sample being allowed to transform into martensitic state after the treatment; and carrying out surface treatment by local surface rolling, said treatment preferably being carried out for a sample having a thickness at the treated portion of 1 mm or more.

Further, the surface modification can be carried out in the direction of about parallel to the trace of twin type 2 on the surface of the object at the site of the treatment; and the surface modification can be carried out on at least one, for example on at least two surfaces of the object.

The surface modification can be carried out by subjecting the object to a treatment which will affect the surface layer or surface region of the object, said surface layer or surface region comprising 20%, preferably less than 5%, advantageously less than 1% at the most of the total thickness of the object at the site of the treatment.

With regard to the MSM alloys, it should here be noted that the alloy can be any suitable alloy. In one embodiment, the alloy is a composition of at least two of the elements included in the group of Ni, Mn, Ga, Cr, Co, Cu, Fe, Ti, Al, In, Zr, Mo, Ta, W, V, Nb, Y and Pd. Preferably the alloy contains at least two metals selected from nickel, manganese and gallium; in particular the alloys incorporate at least Ni, Mn and Ga. In another embodiment, the alloy is a composition of Ni, Mn and Ga, with an optional addition of at least one element selected from the group of Cr, Co, Cu, Fe, Ti, Al, In, Zr, Mo, Ta, W, V, Nb, Y and Pd. Typically, an additional element in addition to Ni, Mn and Ga can be present in amounts of 0.1 to 10 atom-%. Ferromagnetic martensitic alloy formed by the above constituent components are particularly interesting. As discussed, the alloy can, at least at some point of the process, be provided in austenite state.

The alloy can be in the form of an elongated, three-dimensional object having a length, a width and a thickness, thus defining at least three surfaces, the smallest dimension of the object being greater than 0.01 mm, preferably greater than 0.1 mm. For such an object, the surface treatment is carried out on at least one, for example on at least two or at least three surfaces of the object.

In respect to all of the above-mentioned embodiments, the crystal lattice of the material should exhibit lattice monoclinicity. MSM alloys which have the 5M-crystal structure will typically exhibit twin boundaries of types 1 and 2.

The alloy can also be in the shape of e.g. sphere, ellipsoid, round or rectangular bar, plate, wire and tube, cube, block or ring, the smallest dimension of the object being greater than 0.01 mm, preferably greater than 0.1 mm.

EXAMPLE

According to a particular embodiment an MSM alloy element comprising Ni, Mn, Ga was, according to the present technology, prepared by treating the surface of the prior art MSM element by the method referred to as "Directed Deformation Patterning" (DDP) by using the following parameters:

Taking an MSM element;
Determining the direction of twin boundary type 2 trace on sample surface by using optical microscopy;
Marking the determined direction on the sample surface, for example with ink;
Heating the sample to a temperature above the austenite temperature (in the particular case to 70° C.); and
Deforming the surface of sample by an indenter with spherical tip having diameter of 1 mm—the deformation was performed along the direction marked e.g. by ink.

In a particular embodiment, the force applied on the indenter tip was 400 g.

In a particular embodiment, a laminate twin microstructure comprising twins type 2 was made by application of several parallel lines along the direction marked (e.g. by ink).

Finally, the element was cooled to martensitic state (room temperature in this particular embodiment).

REFERENCES

1. A. A. Likhachev and K. Ullakko. "Magnetic-field-controlled twin boundaries motion and giant magneto-mechanical effects in Ni—Mn—Ga shape memory alloy" Physics Letters A, Vol. 275, Issues 1-2, 2000, Pages 142-151.
2. L. Righi, F. Albertini, L. Pareti, A. Paoluzi, G. Calestani. "Commensurate and incommensurate "5M" modulated crystal structures in Ni—Mn—Ga martensitic phases" Acta Materialia, Vol. 55, 2007, Pages 5237-5245.
3. Z. Li, Y. Zhang, C. Esling, X. Zhao, Liang Zuo. "Twin relationships of 5M modulated martensite in Ni—Mn—Ga alloy. (to be published) Acta Materialia (2011), doi: 10.1016/j.actamat.2011.02.014.
4. R. Chulist, A. Sozinov, L. Straka, N. Lanska, A. Soroka, T. Lippmann, C.-G. Oertel and W. Skrotzki. Diffraction study on polysynthetically twinned 10M modulated Ni—Mn—Ga martensite. *Acta Materialia*, 2012, to be published.
5. V. S. Boyko, R. I. Garber, A. M. Kossevich. Reversible Crystal Plasticity. published by AIP Press, American Institute of Physiscs, New York, 1994, isbn 0-88318-869-4.

The invention claimed is:

1. An Magnetic Shape Memory (MSM) specimen for use in an actuator, sensor or energy harvester, said MSM specimen having 5M-crystal structure in which twin boundary motion is facilitated primarily by created twin boundaries type 2 with twinning plane deviating ±2-4 degrees from the (101) or equivalent crystallographic plane by rotation about [−101] or equivalent crystallographic direction, wherein the specimen is a composition comprising at least Ni, Mn and Ga and wherein the specimen has a MSM effect based on the rearrangement of crystallographic domains in an applied magnetic field and wherein the twinning stress for the specimen is less than 0.3 MPa.

2. The specimen according to claim 1, wherein twin boundaries type 2 connects adjacent crystallographic domains by rotation about twin shear direction [−101] or equivalent crystallographic plane, and in result of the rotation the twinning plane of such a boundary is deviated by ±2-4 degrees from the (101) or equivalent crystallographic plane by rotation about [−101] or equivalent crystallographic direction.

3. The specimen according to claim 1, comprising segmented twin boundaries of type 2.

4. The specimen according to claim 1, wherein the alloy is 5-layered Ni—Mn—Ga magnetic shape memory alloy.

5. The specimen according to claim 1 further comprising at least one element selected from the group of Cr, Co, Cu, Fe, Ti, Al, In, Zr, Mo, Ta, W, V, Nb, Y and Pd.

6. The specimen according to claim 1 further comprising up to 10 atom-% of at least one element selected from the group of Cr, Co, Cu, Fe, Ti, Al, In, Zr, Mo, Ta, W, V, Nb, Y and Pd.

7. The specimen according to claim 1, wherein the specimen has a twinning stress between 0.05-0.1 MPa.

* * * * *